C. P. HOLMES.
SEWING MACHINE.
APPLICATION FILED MAR. 3, 1909.

1,030,814.

Patented June 25, 1912.

5 SHEETS—SHEET 1.

Witnesses:
E. C. Wurdeman
M. L. Gilman.

Inventor:
Charles P. Holmes
by his Attorneys
Phillips Van Everen & Fish

C. P. HOLMES.
SEWING MACHINE.
APPLICATION FILED MAR. 3, 1909.

1,030,814.

Patented June 25, 1912.

5 SHEETS—SHEET 3.

Witnesses:
E. C. Wurdeman
M. L. Gilman

Inventor:
Charles P. Holmes
by his Attorneys
Phillips Van Everen & Fish

C. P. HOLMES.
SEWING MACHINE.
APPLICATION FILED MAR. 3, 1909.
1,030,814.
Patented June 25, 1912.
5 SHEETS—SHEET 4.
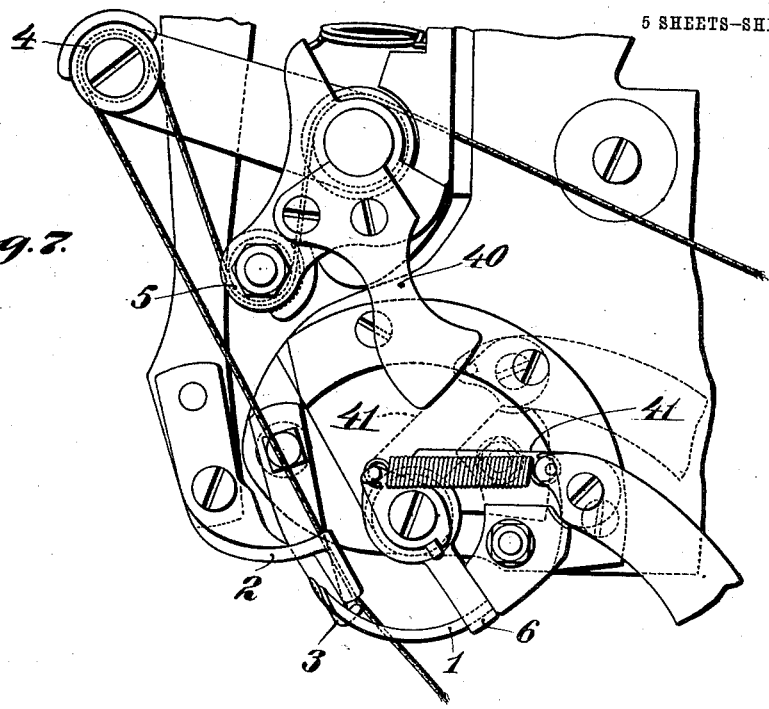
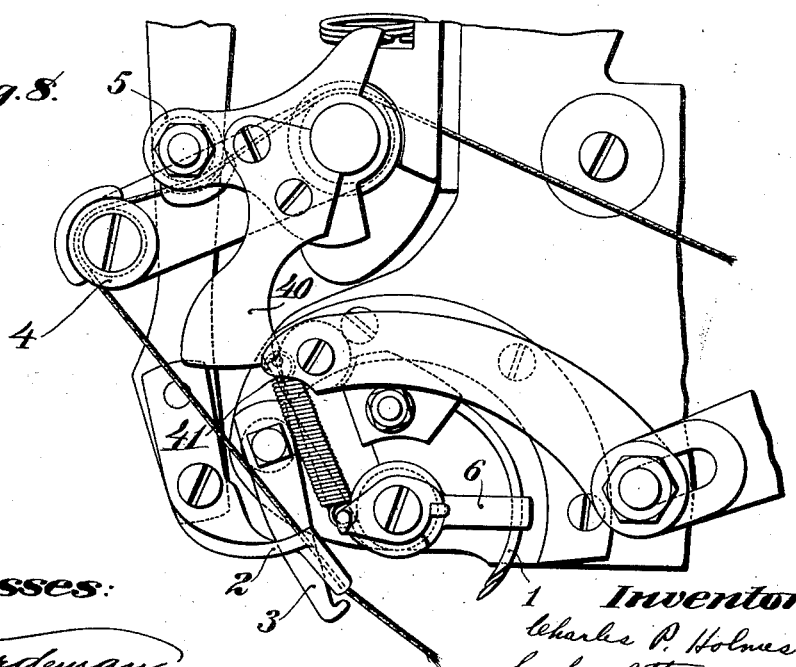
Witnesses:
E. C. Wurdeman
M. L. Gilman
Inventor:
Charles P. Holmes
by his Attorneys
Phillips Van Everen & Fish

C. P. HOLMES.
SEWING MACHINE.
APPLICATION FILED MAR. 3, 1909.

1,030,814.

Patented June 25, 1912.

5 SHEETS—SHEET 5.

Witnesses:
E. C. Wurdeman
M. L. Gilman

Inventor:
Charles P. Holmes
by his Attorneys
Phillips Van Everen & Fish

COLUMBIA PLANOGRAPH CO., WASHINGTON, D. C.

UNITED STATES PATENT OFFICE.

CHARLES P. HOLMES, OF LYNN, MASSACHUSETTS, ASSIGNOR TO SYDNEY W. WINSLOW, OF BEVERLY, MASSACHUSETTS.

SEWING-MACHINE.

1,030,814.  Specification of Letters Patent.  Patented June 25, 1912.

Application filed March 3, 1909. Serial No. 481,158.

*To all whom it may concern:*

Be it known that I, CHARLES P. HOLMES, a citizen of the United States, residing at Lynn, in the county of Essex and State of Massachusetts, have invented certain new and useful Improvements in Sewing-Machines; and I do hereby declare the following to be a full, clear, and exact description of the invention, such as will enable others skilled in the art to which it appertains to make and use the same.

The present invention relates to sewing machines and particularly to that class of sewing machines which comprise a hook needle and devices coöperating therewith to form a chain stitch.

The invention is intended primarily as an improvement in chain stitch curved needle shoe sewing machines, and the principal object of the invention is to improve the arrangement and mode of operation of the thread handling devices of this type of machine. It is to be understood however, that certain features of the invention are not limited to use in this particular type of machine nor except as defined in the claims are the several features of the present invention limited to any particular construction or arrangement of parts.

The several features of the present invention will be clearly understood from an inspection of the accompanying drawings in which is illustrated a curved hook needle shoe sewing machine, of the type known in the art as a welt shoe sewing machine provided with the preferred form of devices to adapt it to handle the thread in the manner contemplated by the present invention.

Figure 1:
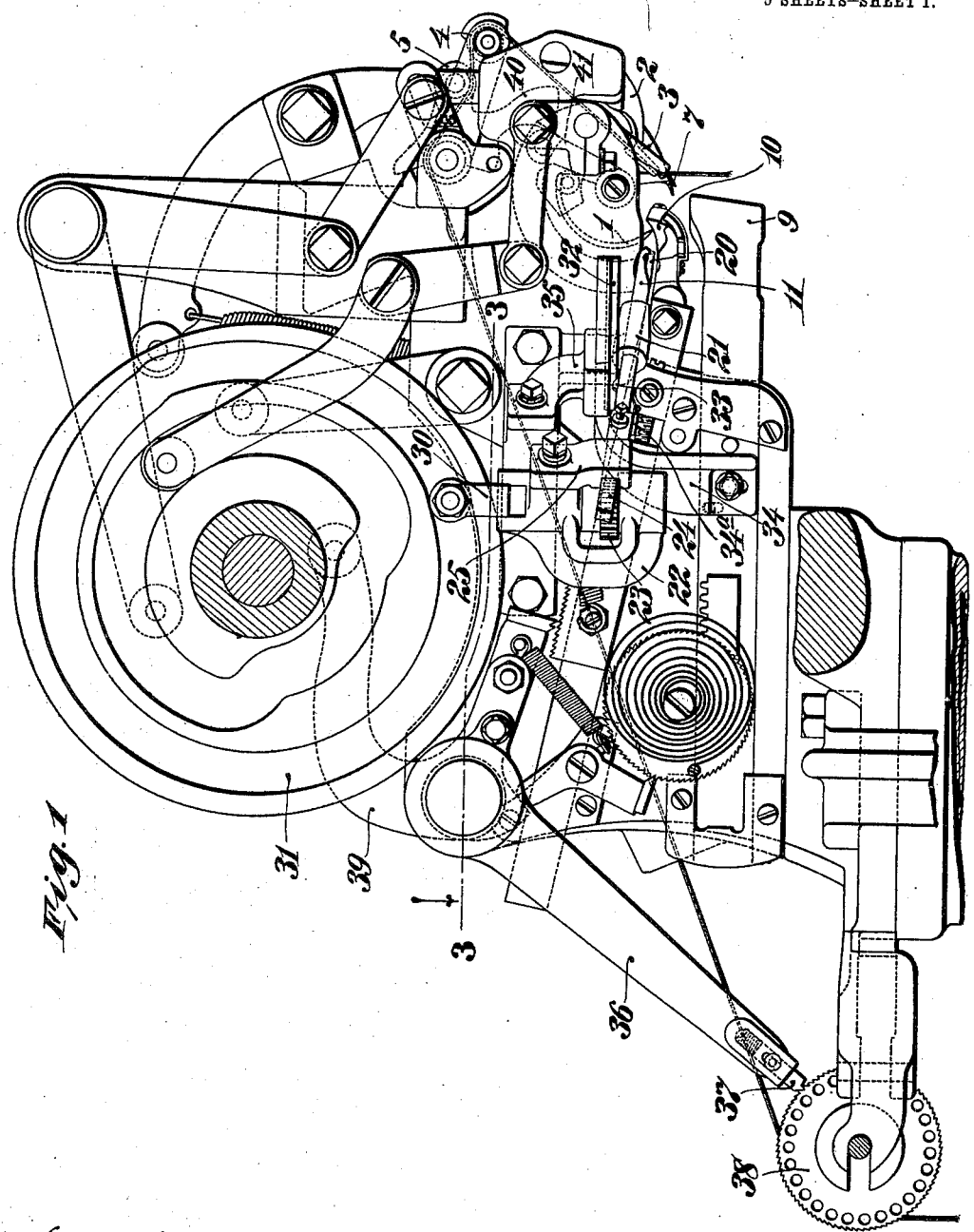
Figure 2:
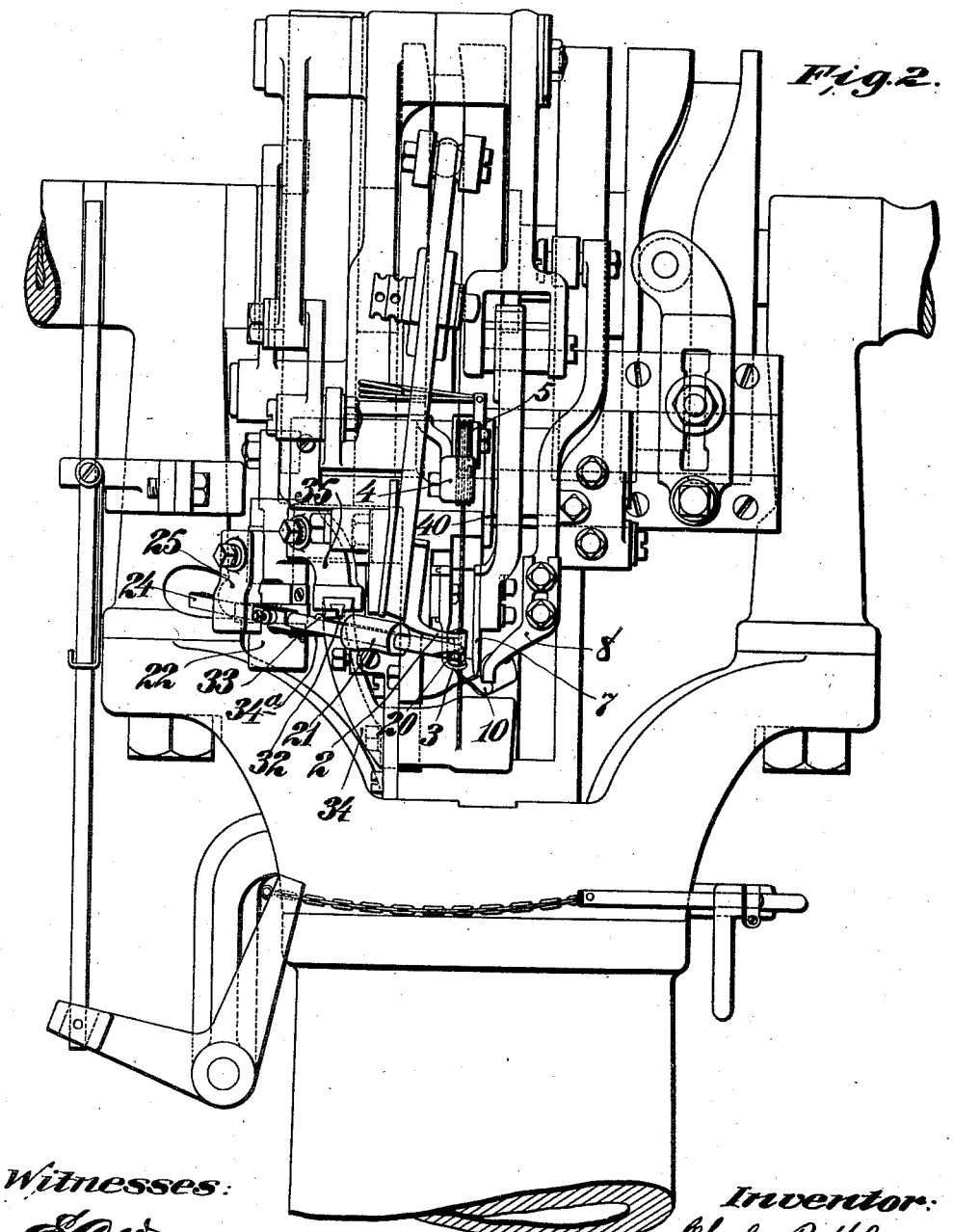
Figure 3:
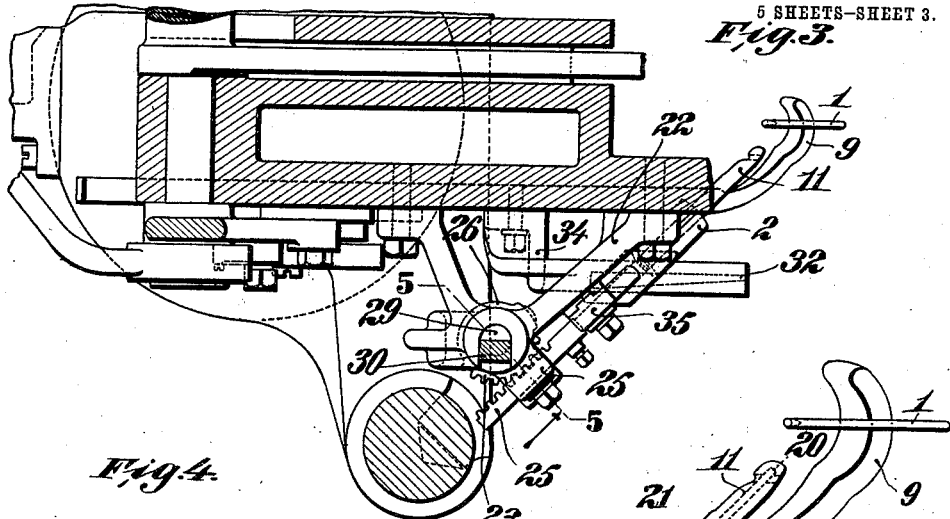
Figure 4:
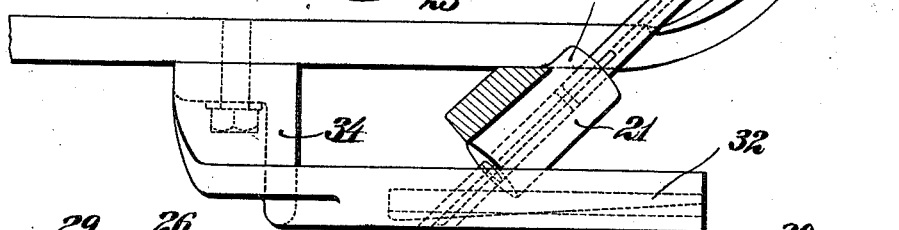
Figure 5:
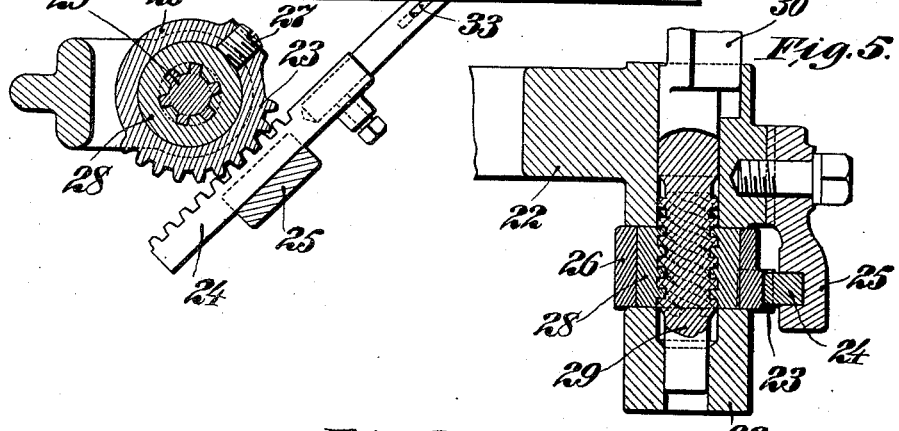
Figure 6:
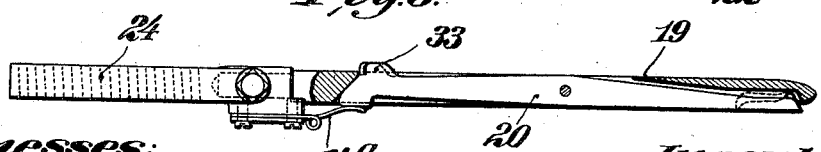
Figure 15:
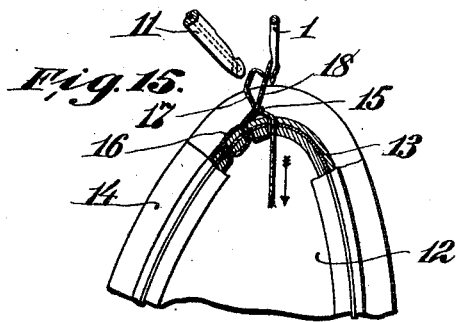
Figure 16:
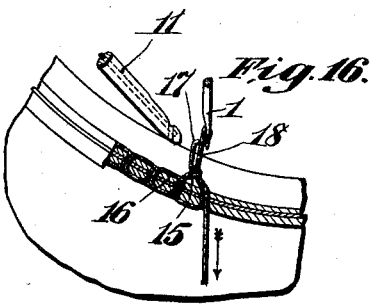

Figure 1 of the drawings is a view in side elevation of the machine with a portion of the frame broken away. Fig. 2 is a view in front elevation. Fig. 3 is a detail sectional plan view taken on the line 3—3, of Fig. 1. Fig. 4 is a detail sectional plan view on an enlarged scale illustrating the construction and arrangement of the gripping device and its actuating mechanism. Fig. 5 is a detail sectional view taken on the line 5—5, of Fig. 3. Fig. 6 is a detail view in side elevation partly in section of the gripping device. Fig. 7 is a detail view in side elevation illustrating the mechanism for raising the auxiliary take-up during the retracting stroke of the needle. Fig. 8 is a view similar to Fig. 7 showing the parts in the position they occupy after the needle has been retracted. Figs. 9 to 14 inclusive illustrate somewhat diagrammatically the operations performed by the machine in sewing a seam. Fig. 15 is a view illustrating somewhat diagrammatically the operation of the gripping device while the toe portion of the shoe is being sewed and Fig. 16 is a similar view illustrating the action of the gripping device while the shank portion of the shoe is being sewed.

The welt sewing machine illustrated in the drawings, except as hereinafter described, has the same general construction and mode of operation as the well known Goodyear welt and turn shoe sewing machine disclosed with substantial accuracy in the patent to French and Meyer, No. 412,704. The machine is provided with an oscillating curved hook needle 1, a looper 2 for laying the thread in the hook of the needle after the needle has pierced the work, a thread arm 3 to engage the thread between the looper and the work and form a loop between the needle and the work, which loop is given up to the needle during the first part of its retracting stroke, a main take-up 4, an auxiliary take-up 5, a needle guide 6, a feed point 7, and a channel guide 8, all of which, with the exception of the auxiliary take-up, are constructed and arranged and operated in the same manner as in the Goodyear welt and turn machine. The machine is also provided with a back gage or work rest 9 and with a welt guide 10 constructed and arranged to operate as in the Goodyear welt and turn machine. In addition to these parts the welt sewing machine illustrated in the drawings is provided with a thread gripping device indicated at 11 which enables the machine to manipulate the thread in the manner contemplated by the present invention and also with means for positively raising the auxiliary take-up, and for positively rotating the tension wheel at certain times during the operation of the machine so as to relieve the thread of tension for purposes hereinafter described.

Figure 9:
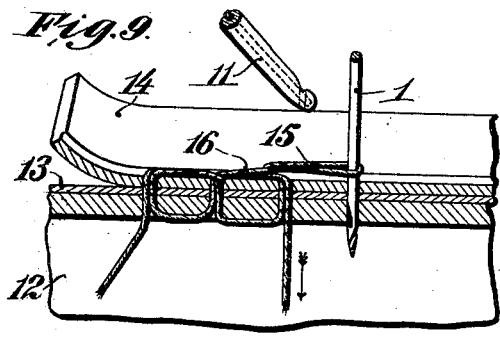
Figure 10:
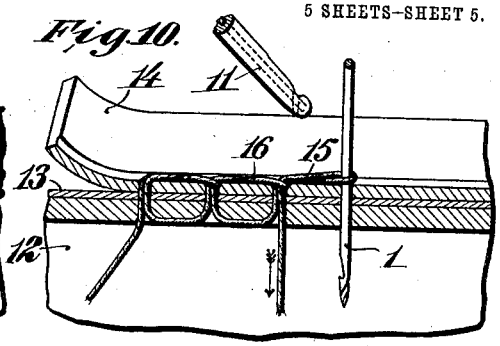
Figure 11:
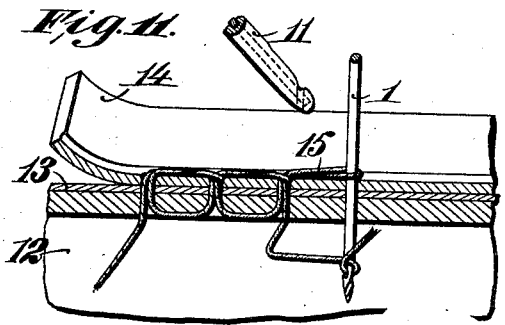
Figure 12:
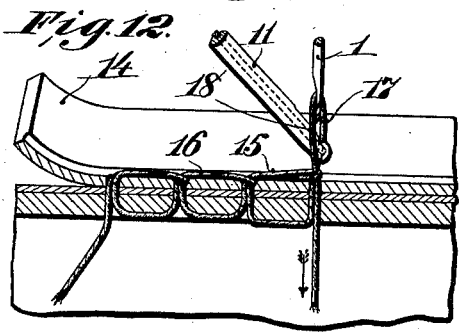

The manner in which the thread is manipulated by the thread handling devices of the machine will be apparent from an inspection of Figs. 9 to 14. In these figures, 12 indicates the insole of a lasted shoe, 13 the upper and 14 the welt. In Fig. 9 the needle is shown as passing forward through the welt, upper and between substance of the insole, and as emerging from the channel. A loop of thread 15 extends around the shank of the needle and the supply side of this loop extends through a preceding loop 16 and through the work to the looper. As the needle completes its forward movement to the position indicated in Fig. 10, the take-up acts to draw the loop 15 tightly around the shank of the needle and thereby pull the loop 16 forward and down against the material. While the needle is still in the position illustrated in Fig. 10, the thread arm acts to form a loop between the needle and the work and the looper lays the thread in the hook of the needle, as indicated in Fig. 11. The needle now retracts and draws a loop of thread through the material and through the loop 15, as indicated in Fig. 12, the thread arm giving up its loop to the needle during the first part of the retracting stroke of the needle so that the thread does not reeve through the hook of the needle and no injurious strain is brought upon the thread, or the work. As so far described the operations are the same as those formed upon the thread by the thread handling devices of the Goodyear welt and turn machine. The needle continues its retracting movement until it reaches the position indicated in Fig. 12, in which position it will be noted, that the loop 15 extends around the loop drawn out by the needle and is of a length sufficient to reach from the preceding needle hole to the last needle hole.

Figure 13:
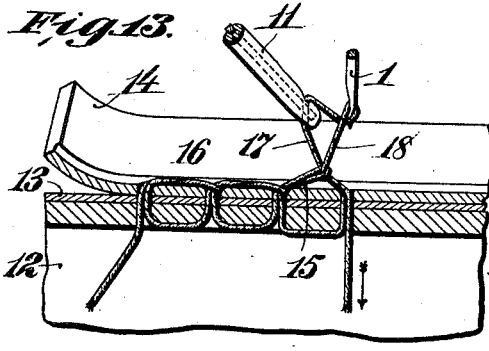
Figure 14:
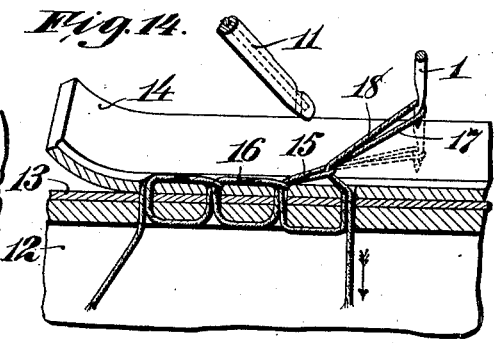

To cause a tight seam to be formed when the loop 15 is drawn forward, the slack thread should be removed from the loop 15 and the loop drawn back of the last needle hole. To secure this result the gripping device 11 is advanced as illustrated in Fig. 12 and grasps the side 17 of the loop drawn up by the needle which leads to the preceding loop 15 and is then retracted as illustrated in Fig. 13 away from the work and in the general direction of the seam or in the direction of feed. This retracting movement of the gripping device 11 pulls upon the thread leading to the preceding loop 15 and shortens said loop so that the end of the loop is drawn back of the last needle hole. The direction of movement of the gripping device 11 is such that the supply side 18 of the needle loop is left slack and therefore offers no appreciable resistance to the shortening of the loop 15. The loop 15 is thus shortened accurately and to the desired extent so that when it is subsequently pulled forward, the stitch, of which the loop forms a part, tightly compresses and binds the layers of material together. To insure a sufficient amount of slack thread in the supply side 18 of the needle loop, and to obviate any liability of this side of the loop being drawn taut during the action of the gripping device, the thread leading from the work to the supply may be slackened and relieved of tension prior to, or during the action of the gripping device. In the welt sewing machine illustrated in the drawings, this is accomplished by a forward rotation of the tension wheel by means hereinafter described. After the loop 15 has been shortened, as indicated in Fig. 13, the work side 17 of the needle loop is released by the gripping device and the work is fed the length of a stitch. This movement of the work brings the parts into the relative positions indicated in Fig. 14 with the needle still at the limit of its back stroke and with the loop of needle thread extending from the hook of the needle to the preceding loop 15. The needle now passes forward and pierces the work, as indicated in Figs. 9 and 10, and the take-up acts to pull the needle loop tightly around the shank of the needle and the preceding loop forward and down against the material as has already been described.

From the preceding description, it will be seen that the principal function of the gripping device 11 is to pull on the work side of the needle loop and shorten the preceding loop. It will be seen from an inspection of Figs. 13 and 14, however, that the gripping device pulls on the needle loop after the needle is retracted and before the work is fed and thereby provides a sufficient amount of slack in the needle loop to enable the work to be fed without causing the needle loop to exert an objectionable lateral strain on the needle. The work can therefore be fed easily without bringing any injurious strain upon the needle, the thread or the work, and without interfering with the manipulation of the work by the operator. From an inspection of Figs. 12 and 13, it will be also noted that the gripping device grasps the rear side of the needle loop and pulls on the loop in such a manner as to wrap the thread around the point of the needle so that there is no liability of the needle loop being pulled out of the hook of the needle by the gripping device.

It is desirable that the loops of the chain be shortened to a greater extent at the toe portion of a shoe than at the shank. In the machine illustrated in the drawings, means are accordingly provided by which the thread pulling movement of the gripping device can be varied so that more or less thread is pulled from the preceding loop by the gripper according to the part of the shoe being operated upon. This variation in the thread drawing stroke of the gripping device is indicated in Figs. 15 and 16, which show that more thread is pulled from the preceding loop at the toe portion of the shoe than at the shank portion.

The gripping device illustrated in the drawings consists of a cylindrical rod 19 shaped at its forward end to form a gripping jaw and a lever 20 pivotally mounted mid-way its length in a longitudinal slot in the bar 19 and provided at its forward end with a gripping jaw to coöperate with the jaw on the rods. The jaw on the forward end of the rod 19 is formed by cutting the rod away on its under and inner side so as to leave a downwardly and inwardly extending projection at its end in the form of a blunt hook. The longitudinal slot in the rod extends slightly into this projection and forms a recess into which the thread is pressed by the forward end of the lever 20. The shape of the forward end of the rod 19 is such that the gripping device can move forward into position to grasp the work side of the needle loop, as indicated in Fig. 12, without liability of striking the needle or of engaging the supply side of the loop and when the gripping device is retracted the thread extends around the projection as indicated in Fig. 13. The forward end of the lever 20 is slightly rounded off and is shaped to fit into the recess in the projection at the end of the rod 19.

The rod 19 of the gripping device is mounted to reciprocate in a guideway formed in a projection 21 from the bracket 22 bolted to the frame of the machine. The rod is reciprocated in this guideway by means of an oscillating toothed segment 23, which engages the teeth of a rack bar 24 secured to the rear end of the rod. This rack bar is received in, and guided by, a guiding slot formed in a bracket 25 secured to the bracket 22. The segment 23 is formed upon a sleeve 26 which is rigidly secured by a clamping screw 27 to an internally threaded nut 28 mounted in a slot in the bracket 22 and held therein against axial or longitudinal movement. A vertically arranged screw-threaded rod 29 passes through the nut and works in guideways in the bracket 22 above and below the nut. The rod is held against rotation by means of a lateral off-set 30 near its upper end which engages a slot in the upper portion of the bracket 22. At its upper end the rod 29 is provided with a roll which is engaged by a groove 31 in one of the cam disks of the machine, which groove is so shaped that during the operation of the machine the rod 29 is reciprocated at the required times to oscillate the nut 28 and advance and retract the rod 19 of the gripping device.

During the reciprocating movements of the rod 19, the lever 20 is actuated to grasp and release the thread, and in order that the thread may be firmly grasped and securely held during the retracting stroke of the gripping device, positively acting means are provided for actuating the lever 20 to grip the thread. This means consists of a cam plate 32 arranged to extend above the rod 19 and contact with an upwardly extending projection 33 at the rear end of the lever 20 during each forward and retracting movement of the rod. A leaf spring 34$^a$, secured to the rack bar 24, and bearing against the under side of the rear end of the lever 20, actuates the lever to open the gripping jaws as soon as the projection 33 passes out of engagement with the cam plate 32. The cam plate 32 is so arranged that as the rod 19 nears the limit of its forward movement, the gripping jaws are open to receive the thread and during the retracting movement of the gripping device the jaws are held positively in engagement with the thread until the loop preceding the needle loop has been shortened to the desired extent. The continued retracting movement of the gripping device moves the projection 33 of the lever 20 out of engagement with the cam plate 32 and the gripping jaws open to release the thread and allow the work to be fed as has heretofore been described.

As has been stated the gripping device of the welt sewing machine illustrated in the drawings is so actuated that the loop of thread preceding the needle loop is shortened to a greater extent at the toe portion of a shoe than at the shank. This result is secured by using a cam plate 32 which varies in width and by mounting the cam plate upon a bracket 34 secured to the slide of the back gage 9 so that different portions of the cam plate will be brought into the path of the projection 33 of the gripping device during the sewing operation. The position of the back gage 9 is determined by the shape of the last, the gage being farther forward when in engagement with the toe portion of the shoe than when in engagement with the shank. The cam plate 32 decreases in width from the rear toward the front as is clearly shown in Fig. 4 and consequently it will be apparent that as the cam plate moves forward with the back gage while the toe of the shoe is being sewed, the thread drawing stroke of the gripping device will be increased, and that when the cam plate moves to the rear with the back gage, when the shank portion of the shoe is reached, the thread drawing stroke of the gripping device will be diminished.

To guide the portion of the bracket in which the cam plate 32 is mounted, and hold it firmly against the upward thrust exerted by the projection 33 of the gripping device, a bracket 35, provided with a suitably shaped guiding groove in its lower face, is secured to the bracket 22 and arranged to engage this portion of the bracket 34. To adapt the gripper operating mechanism for thread of different sizes, the bracket 34 is secured to the back gage slide so as to be capable of vertical adjustment and also the block 35 is adjustably secured to the bracket 22. In order that the thread drawing stroke of the gripping device may be changed to adapt the machine for operation on different styles or qualities of work, the cam plate 32 is mounted in the bracket 34 so that it can be removed and a plate of a different size substituted therefor. As shown in the drawings the cam plate is provided with a dove-tailed rib which engages a correspondingly shaped groove in the bracket 34. If desired, provision can be made for the lateral adjustment of the cam plate 32 to change the times in the movement of the gripping device at which the jaws are actuated to grasp and release the thread.

The means hereinbefore referred to for rotating the tension wheel to slacken the supply thread and relieve it of tension, during the thread drawing stroke of the gripping device consists of an arm 36 provided with a spring pressed pawl 37 engaging the teeth of a ratchet wheel 38 secured to the tension wheel. The arm 36 projects from the hub of a cam actuated lever 39.

The means hereinbefore referred to for positively raising the auxiliary take-up consists of a plate 40 secured to the arm of the auxiliary take-up and arranged to extend into the path of the needle segment 41, the arrangement of the plate 40 being such that it is engaged by the segment during the retracting stroke of the needle just as the barb is entering the between substance, and during the continued movement of the needle the auxiliary take-up is positively raised so that it exerts no further tension upon the thread. The needle is thus relieved of the strain of pulling against the tension of the auxiliary take-up and the auxiliary take-up is prevented from placing any tension on the thread during the action of the thread gripping device which would interfere with the shortening of the previous loop.

The invention having been thus described, what is claimed is:—

1. A chain stitch sewing machine, having, in combination, stitch forming devices, including a hook needle operating to draw a loop of thread through the materials and through a previously formed loop, a gripping device, and means for actuating said device to grip the loop drawn out by the needle and pull thereon before the work is fed to shorten the preceding loop and provide slack in the needle loop and means for feeding the work while said slack remains in the needle loop.

2. A chain stitch sewing machine, having, in combination, stitch forming devices including a hook needle operating to draw a loop of thread through the materials and through a previously formed loop, a gripping device, means for actuating said device to grip the loop drawn out by the needle and pull thereon to shorten the preceding loop and means for varying the thread pulling stroke of the gripping device.

3. A chain stitch sewing machine, having, in combination, stitch forming devices including a hook needle operating to draw a loop of thread through the materials and through a previously formed loop, a gripping device, means for actuating said device to grip the loop drawn out by the needle and pull thereon to shorten the preceding loop, and means acting automatically during the operation of the machine to vary the thread pulling stroke of the gripping device.

4. A chain stitch sewing machine, having, in combination, stitch forming devices including a curved hook needle operating to draw a loop of thread through the materials and through a previously formed loop, a gripping device and means for actuating said device to grip the rear side of the loop drawn out by the needle and pull thereon to shorten the preceding loop and in a direction to wrap the thread around the needle.

5. A chain stitch sewing machine, having, in combination, stitch forming devices including a curved hook needle, a take-up, an auxiliary take-up, needle actuating mechanism and means whereby said mechanism acts during the retracting stroke of the needle to raise the auxiliary take-up.

6. A chain stitch sewing machine, having, in combination, stitch forming devices including a curved hook needle, a take-up, an auxiliary take-up, and a needle segment arranged to raise the auxiliary take-up during the retracting stroke of the needle.

7. A chain stitch sewing machine, having, in combination, stitch forming devices including a hook needle operating to draw a loop of thread through the materials and through a previously formed loop, a gripping device, means for actuating said device to grip the work side of the loop drawn out by the needle and exert a pull thereon to shorten the preceding loop and means for relieving the supply side of the needle loop of tension during the thread pulling stroke of the gripping device.

8. A chain stitch sewing machine, having, in combination, stitch forming devices including a hook needle operating to draw a loop of thread through the materials and through a previously formed loop, a gripping device, means for actuating said device to grip the work side of the loop drawn out by the needle and exert a pull thereon to shorten the preceding loop, and means for drawing thread from the supply to relieve the supply side of the needle loop of tension during the thread pulling stroke of the gripping device.

9. A chain stitch sewing machine, having, in combination, stitch forming devices including a hook needle operating to draw a loop of thread through the materials and through a previously formed loop, a gripping device, means for actuating said device to grip the work side of the loop drawn out by the needle and exert a pull thereon to shorten the preceding loop, and means for giving up thread on the supply side of the work to relieve the supply side of the needle loop of tension during the thread pulling stroke of the gripping device.

10. A chain stitch sewing machine, having, in combination, stitch forming devices including a hook needle operating to draw a loop of thread through the materials and through a previously formed loop, means for gripping and pulling on the needle loop to shorten the preceding loop comprising a reciprocating rod provided at its end with a slotted projection forming a gripping jaw, a movable gripping jaw to coöperate therewith mounted on the rod, means for actuating the movable jaw to grip and release the thread and means for reciprocating the rod.

11. A chain stitch sewing machine, having, in combination, stitch forming devices including a hook needle operating to draw a loop of thread through the materials and through a previously formed loop, a gripping device arranged to grip the loop of thread drawn out by the needle and exert a pull thereon to shorten the preceding loop, means for reciprocating the gripping device, a cam plate of varying width across which the gripper reciprocates arranged to actuate the gripping device positively to grip the thread and means for changing the position of the cam during the operation of the machine to vary the thread pulling stroke of the gripping device.

12. A chain stitch sewing machine, having, in combination, stitch forming devices, including a curved hook needle operating to draw a loop of thread through the materials and through a previously formed loop, a work rest slide, a gripping device arranged to grip the loop of thread drawn out by the needle and exert a pull thereon to shorten the preceding loop, means for reciprocating the gripping device, a cam plate of varying width across which the gripper reciprocates, mounted to move with the work rest slide and arranged to actuate the gripping device positively to grip the thread.

13. A chain stitch sewing machine, having, in combination, stitch forming devices including a curved hook needle operating to draw a loop of thread through the materials and through a previously formed loop, a gripping device, means for actuating said device to grip the loop drawn out by the needle and exert a pull thereon to shorten the preceding loop, and a take-up acting while the needle is in the work to pull the needle loop tight around the shank of the needle and pull the preceding loop forward to exert a stitch setting strain on the seam.

14. A chain stitch shoe sewing machine, having, in combination, stitch forming devices including a hook needle operating to draw a loop of thread through the materials and through a previously formed loop, means for feeding the work, a gripping device, and means for actuating said device to grip the work side of the loop drawn out by the needle and pull thereon before the work is fed to shorten the preceding loop.

15. A chain stitch sewing machine, having, in combination, stitch forming devices including a hook needle operating to draw a loop of thread through the materials and through a previously formed loop, means acting on the loop drawn out by the needle in the general direction of the previously formed seam to shorten the preceding loop, and means for relieving the supply end of the thread of tension while the preceding loop is being shortened.

16. A chain stitch sewing machine, having, in combination, stitch forming devices including a curved hook needle operating to draw a loop of thread through the materials and through a previously formed loop, means acting on the needle loop in the general direction of the previously formed seam to shorten the preceding loop, means for relieving the supply end of the thread of tension while the preceding loop is being shortened, and a take up acting while the needle is in the work to pull the needle loop tight around the shank of the needle and pull the preceding loop forward to exert a stitch setting strain on the seam.

17. A chain stitch sewing machine, having, in combination, stitch forming devices including a hook needle operating to draw a loop of thread through the materials and through a previously formed loop, a loop shortening device, means for actuating said device to engage the loop drawn out by the needle and to move said device in the general direction of the previously formed seam to shorten the preceding loop and means for varying the extent of the thread pulling stroke of said loop shortening device.

In testimony whereof I affix my signature, in presence of two witnesses.

CHARLES P. HOLMES.

Witnesses:
 FRED O. FISH,
 M. L. GILMAN.

Copies of this patent may be obtained for five cents each, by addressing the "Commissioner of Patents, Washington, D. C."